No. 647,407. Patented Apr. 10, 1900.
J. H. HORN.
TIRE SETTING AND COOLING MACHINE.
(Application filed Oct. 14, 1899.)
(No Model.)
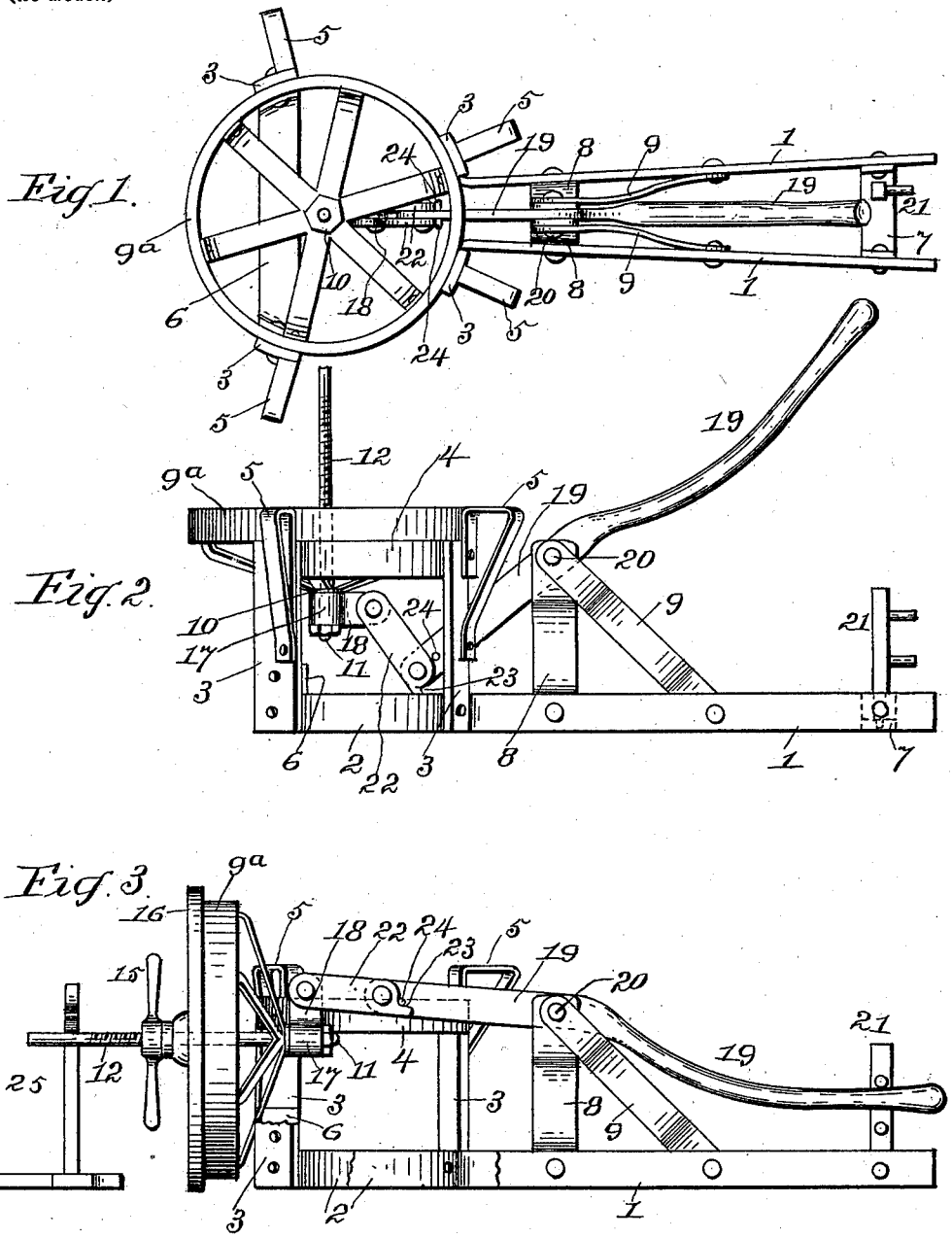
Witnesses.
C. J. Belt
Michael J. Madigan
Inventor.
Joseph H. Horn,
By W. H. Wills
Attorney.

UNITED STATES PATENT OFFICE.

JOSEPH H. HORN, OF QUEHI, TEXAS.

TIRE SETTING AND COOLING MACHINE.

SPECIFICATION forming part of Letters Patent No. 647,407, dated April 10, 1900.

Application filed October 14, 1899. Serial No. 733,599. (No model.)

*To all whom it may concern:*

Be it known that I, JOSEPH H. HORN, a citizen of the United States, residing at Quehi, in the county of Medina and State of Texas, have invented certain new and useful Improvements in Tire Setting and Cooling Machines, of which the following is a specification.

This invention relates to wheelright machinery, and particularly to a tire setting and cooling machine of novel and peculiar construction adapted to hold the wheel while the tire is set and by operating a hand-lever to throw the wheel at right angles to the position it has while the tire is being placed thereon, in which thrown position the wheel is free to be revolved in a body of water for cooling the tire.

The invention consists in the novel construction, combination, and arrangement of parts.

In the accompanying drawings, forming part of this application, Figure 1 is a top view of the machine with the wheel-carrier in position to hold a wheel for setting the tire. Fig. 2 is a side elevation. Fig. 3 is a side elevation, partly broken away, showing the carrier and wheel thereon in position for cooling the tire.

The same numeral references denote the same parts in the several views of the drawings.

The frame of the machine consists of two base-pieces 1, having curved or arc-shaped ends 2, which are provided with vertical standards 3, the standards of each base-piece being connected independently by segments 4, so as to form a space or opening between the segments. Each standard 3 is provided with wheel-rests 5, which stand above the top face of the segments 4. The arc-shaped base ends have a brace 6, and the other ends of the base-pieces are joined by a brace 7. Uprights 8 are secured to the base-pieces 1 and have slanting braces 9.

The wheel-carrier 9ª consists of a hub 10, from which extend the short end 11 and the long end 12 of a shaft, the rim-carrier being connected to the hub by suitable spokes or arms. The long end of the shaft is provided with a hand-screw 15 to clamp the wheel 16 to the face of the carrier-rim, and the short end of the shaft, having the hub fixed thereto, is revolubly secured in a collar 17, free of the frame and having a projection 18.

The means for operating the wheel-carrier consists of the hand-lever 19, pivoted by a bolt 20 to the uprights 8, one end of said lever being kept depressed by a vertical rack 21, pivoted to the brace 7, and to the other end of the said lever are pivoted levers 22, the latter being pivoted to the collar projection 18. The levers 22 have notches 23, which engage pins 24 on the hand-lever 19 to stop the levers 22 (when the hand-lever is depressed) in horizontal line with the hand-lever. A suitable jack or support 25 is provided for the long end of the shaft to rest in, so that the carrier may be revolved with the wheel-tire in a body of water.

The operation of the machine is as follows: The carrier rests upon the top face of the segments 4, and the wheel being clamped to the carrier sets upon the rests 5 while the tire is being put on the wheel. Then the hand-lever is pressed down, which upsets the carrier, and by the falling of the levers 22 from a vertical position to a horizontal position throws the carrier and wheel over and the tire into the water. The hand-lever being hooked in the rack 21 and the long end of the shaft resting in the support 25, the carrier and wheel are revolved with the tire in the water until the tire is cooled. After this the hand-lever is released, and the carrier may be lifted to clear the standards 3 and dropped down upon the segments 4, leaving the hand-lever raised and in position to again throw or upset the carrier.

Having thus described my invention, what I claim as new, and desire to secure by Letters Patent, is—

1. In a tire setting and cooling machine, the combination, with the frame, the vertical rack secured to the frame, and the wheel-carrier, of the hand-lever held by the rack and having pins, the levers pivoted to the hand-lever and having notches to engage the pins, and the collar pivotally connecting the carrier with said levers independent of the frame.

2. The combination in a frame for holding a vehicle-wheel and wheel-carrier while the tire is being set, of the base-pieces having arc-shaped ends, the segments, the standards secured to the arc-shaped ends, and connected by the segments, and the wheel-rests projecting above the top face of the segments.

In witness whereof I hereunto set my hand in the presence of two witnesses.

JOSEPH H. HORN.

Witnesses:
JOHN MUESMINK,
M. SCHOROBING.